United States Patent [19]

Green et al.

[11] Patent Number: 4,589,978
[45] Date of Patent: May 20, 1986

[54] CATALYST FOR REDUCTION OF $SO_x$ EMISSIONS FROM FCC UNITS

[75] Inventors: Gary J. Green, Yardley; Tsoung Y. Yan, Philadelphia, both of Pa.

[73] Assignee: Mobil Oil Corporation, New York, N.Y.

[21] Appl. No.: 707,310

[22] Filed: Mar. 1, 1985

[51] Int. Cl.[4] .............................................. C10G 11/00
[52] U.S. Cl. .................................. 208/113; 208/120; 423/244
[58] Field of Search ...................... 423/244 A, 244 R; 208/113, 120; 502/302, 304, 303

[56] References Cited

U.S. PATENT DOCUMENTS

| | | | |
|---|---|---|---|
| 4,346,063 | 8/1982 | Cahn et al. | 423/244 R |
| 4,369,108 | 1/1983 | Bertolacini et al. | 423/244 R |
| 4,376,103 | 3/1983 | Bertolacini et al. | 423/244 R |
| 4,381,991 | 5/1983 | Bertolacini et al. | 423/244 R |

*Primary Examiner*—Andrew H. Metz
*Assistant Examiner*—A. Pal
*Attorney, Agent, or Firm*—Alexander J. McKillop; Michael G. Gilman

[57] ABSTRACT $SO_x$ emission control from a catalytic cracking regenerator unit is improved by using a $SO_x$ transfer catalyst which has improved $SO_x$ adsorption capacity and which consists essentially of cerium or cerium and lanthanum or comprises cerium and/or lanthanum and alumina wherein cerium comprises at least about 1 wt. %.

25 Claims, 1 Drawing Figure

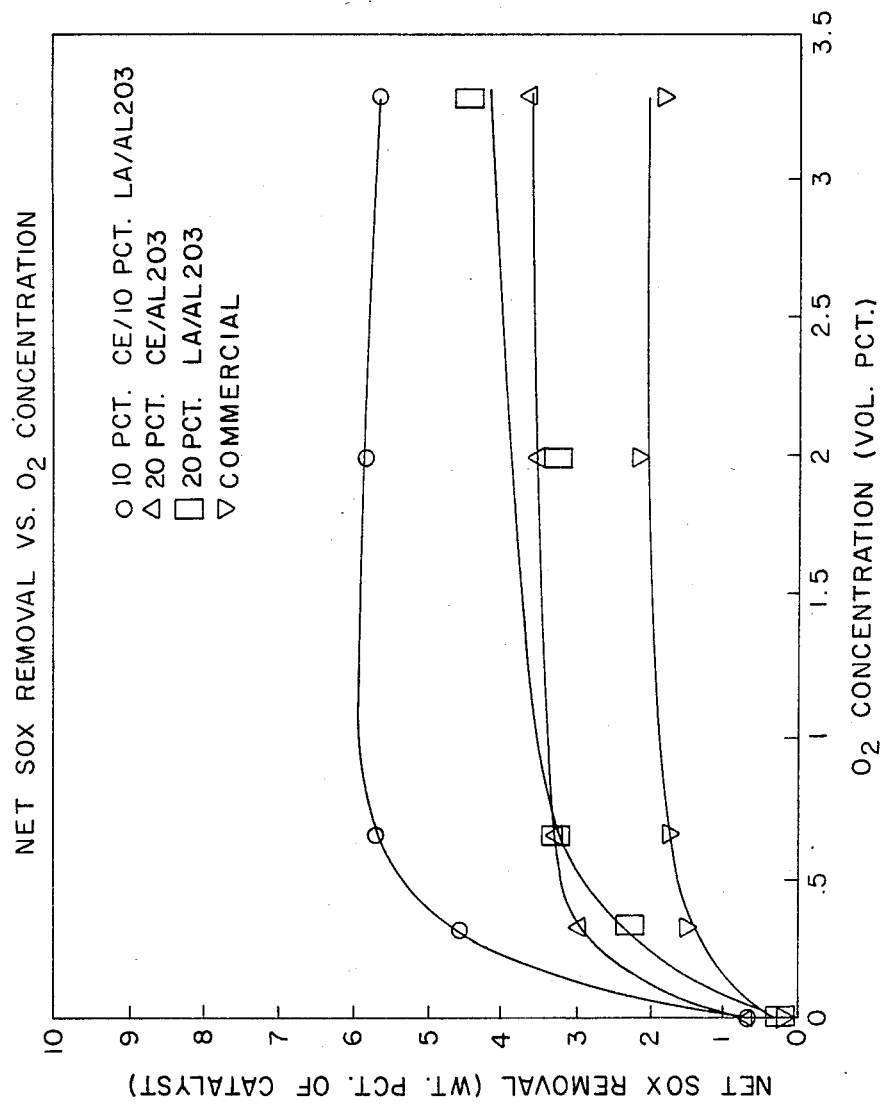

CATALYST FOR REDUCTION OF $SO_x$ EMISSIONS FROM FCC UNITS

BACKGROUND OF THE INVENTION

The present invention relates to a novel catalyst for use a method of reducing pollutant gas levels in flue gases generated in catalyst regenerators in hydrocarbon catalytic cracking systems.

Modern hydrocarbon catalytic cracking systems use a moving bed or fluidized bed of a particulate catalyst. Catalytic cracking is carried out in the absence of externally supplied molecular hydrogen, and is thereby distinguished from hydrocracking in which hydrogen is added. In catalytic cracking, the catalyst is subjected to a continuous cyclic cracking reaction and catalyst regeneration procedure. In a fluidized catalytic cracking (FCC) system, a stream of hydrocarbon feed is contacted with fluidized catalyst particles in a hydrocarbon cracking zone, or reactor, usually at a temperature of about 800°–1100° F. (427°–600° C.) to yield gasoline and light distillates. The reactions of hydrocarbons at this temperature result in deposition of carbonaceous coke on the catalyst particles. A substantial portion of the sulfur in the cracking feed stock deposits along with the coke on the catalyst. The resulting fluid products are thereafter separated from the coked catalyst and are withdrawn from the cracking zone. The coked catalyst is stripped of volatiles, usually with steam, and is cycled to a catalyst regeneration zone. In the catalyst regenerator, the coked catalyst is contacted with a gas, such as air, which contains a predetermined concentration of molecular oxygen to burn off the coke from the catalyst, consequently heating the catalyst to a high temperature. After regeneration, the hot catalyst is cycled to the cracking zone, where it is used to vaporize the hydrocarbons and to catalyze hydrocarbon cracking. The flue gas formed by combustion of coke in the catalyst regenerator, which contains $SO_x$ and $NO_x$, is removed from the regenerator. Currently, the flue gas may be treated to remove particulates and carbon monoxide, after which the treated gas is normally passed into the atmosphere. Concern with the emission of pollutants in flue gas, such as sulfur oxides, has resulted in a search for improved methods for controlling such pollutants.

The hydrocarbon feeds processed in commercial FCC units normally contain sulfur, usually termed "feed sulfur". It has been found that about 2–10% or more of the sulfur in a hydrocarbon feedstream processed in an FCC system is invariably transferred from the feed to the catalyst particles as a part of the coke formed on the catalyst particles during cracking. The sulfur deposited on the catalyst, herein termed "coke sulfur", is passed from the cracking zone on the coked catalyst into the catalyst regenerator. Thus, about 2–10% or more of the feed sulfur is continuously passed from the cracking zone into the catalyst regeneration zone on the coked catalyst. In an FCC catalyst regenerator, sulfur contained in the coke is burned, forming gaseous sulfur dioxide and sulfur trioxide, which are emitted from the regenerator in the flue gas.

Most of the feed sulfur does not become coke sulfur in the cracking reactor. Instead, it is converted either to normally gaseous sulfur compounds such as hydrogen sulfide and carbon oxysulfide, or to normally liquid organic sulfur compounds. All these sulfur compounds are carried along with the vapor cracked hydrocarbon products recovered from the cracking reactor. Thus, about 90% or more of the feed sulfur is continuously removed from the cracking reactor in the stream of processed, cracked hydrocarbons, with about 40–60% of this sulfur being in the form of hydrogen sulfide. Provisions are conventionally made to recover hydrogen sulfide from the effluent from the cracking reactor. Typically, a very-low-molecular-weight off-gas vapor stream is separated from the $C_3+$ liquid hydrocarbons in a gas recovery unit, and the off-gas is treated, as by scrubbing with an amine solution, to remove the hydrogen sulfide. Removal of sulfur compounds such a hydrogen sulfide from the fluid effluent from an FCC cracking reactor, e.g., by amine scrubbing, is relatively simple and inexpensive, relative to removal of sulfur oxides from an FCC regenerator flue gas by conventional methods. Moreover, if all the sulfur which must be removed from streams in an FCC operation could be recovered in a single operation performed on the reactor off-gas, the use of plural sulfur recovery operations in an FCC unit could be obviated, reducing expense.

It has been suggested to reduce the amount of sulfur oxides in FCC regenerator flue gas by desulfurizing a hydrocarbon feed in a separate desulfurization unit prior to cracking or to desulfurize the regenerator flue gas itself, by a conventional flue gas desulfurization procedure, after its removal from the FCC regenerator. Clearly, either of the foregoing alternatives requires an elaborate, extraneous processing operation and entails large capital and utilities expenses.

If sulfur normally removed from the FCC unit as sulfur oxides in the regenerator flue gas is instead converted to $H_2S$ and removed along with the processed cracked hydrocarbons, the sulfur thus shifted from the regenerator flue gas to the reactor effluent constitutes simply a small increment to the large amount of hydrogen sulfide and organic sulfur invariably present in the reactor effluent. The small added expense, if any, of removing even as much as 5–15% more hydrogen sulfide from an FCC reactor off-gas by available means is substantially less than the expense of reducing the flue gas sulfur oxides level by separate feed desulfurization. Present commercial facilities for removing hydrogen sulfide from reactor off-gas can, in most if not all cases, handle any additional hydrogen sulfide which would be added to the off-gas if the sulfur normally discharged in the regenerator flue gas were substantially all shifted to form hydrogen sulfide in the FCC reactor off-gas. It is accordingly desirable to direct substantially all feed sulfur into the fluid cracked products removal pathway from the cracking reactor and thereby reduce the amount of sulfur oxides in the regenerator flue gas.

DESCRIPTION OF THE PRIOR ART

One of the approaches to $SO_x$ emission control from regenerator flue gas is modification of the FCC catalyst system. Thus, fluid cracking catalyst systems which transfer flue gas sulfur oxides ($SO_x$) into reactor-side hydrogen sulfide have been under development for many years. The principle of transferring the flue gas sulfur oxides to the reactor as hydrogen sulfide is accomplished by incorporating appropriate components in the cracking catalyst to capture and release the $SO_x$. The mechanism generally proposed for such a process involves the oxidation of $SO_2$ to $SO_3$ in the regenerator by means of a metal oxidation promoter and the adsorption of the $SO_3$ on a metal oxide site as a sulfate. Alumina is typically used to react with the sulfur oxide compounds to form aluminum sulfate. The sulfur as sulfate is then carried with the catalyst into the reactor where the sulfate is reduced and hydrolyzed to $H_2S$. Use of a $SO_x$ transfer catalyst system for FCC is reviewed by E. Thomas Habib, Jr., "$SO_x$ transfer catalyst systems for FCC need development", Oil and Gas Journal, 81 32:111-13 Aug. 8, 1983) which is hereby incorporated by reference. Flue gas $SO_x$ emissions have been reduced by transfer catalyst systems as described above in some instances. However, currently all systems require highly specific operating conditions and may have other drawbacks such as increased nitric oxides ($NO_x$) emissions. The need for further improvement of this technology to make it both technically effective and economically viable is apparent.

One such transfer catalyst system is disclosed in U.S. Pat. No. 4,252,635 in which the transfer catalyst contains alumina-containing particles which contain sodium, manganese, or phosphorus. In Table 1 of this patent, the transfer catalyst of the invention is compared with transfer catalysts containing alumina as well as other oxidation promoters including rare earth metals such as cerium. As set forth in the patent, 0.5 wt. % cerium was an ineffective promoter relative to the preferred phosphorus, manganese, and sodium and well below the results obtained using a lanthanum promoter.

The present invention is concerned with improvements on the $SO_x$ transfer catalyst and process of using same.

SUMMARY OF THE INVENTION

It has now been found that in processes of utilizing a transfer catalyst to transfer $SO_x$ from a cracking catalyst regenerator to $H_2S$ in the cracking reactor, the rate of $H_2S$ release in the reactor is the controlling step in determining the $SO_x$ transfer efficiency of the catalyst. Surprisingly, it has been found that cerium not only serves to enhance the rates of $SO_x$ absorption but, more importantly, acts to facilitate sulfur release as $H_2S$ in the reactor, thus leading to more efficient overall sulfur removal. This is contrary to the teaching of U.S. Pat. No. 4,252,635. Still further, it has been found that cerium is directly involved in the adsorption of $SO_x$ as a sulfate species. Thus, in processes of $SO_x$ transfer from the catalyst regenerator to $H_2S$ in the reactor, an $SO_x$ transfer catalyst consisting essentially of a rare earth comprising cerium will provide efficient overall sulfur removal. It has also been found that at high regenerator temperatures, the performance of cerium is enhanced by the presence of lanthanum. Therefore, a particularly preferred $SO_x$ transfer catalyst will further include lanthanum in combination with cerium to improve the overall $SO_x$ transfer efficiency.

Preferably, the $SO_x$ transfer catalyst of the present invention will include a metal oxide $SO_x$ adsorbent other than cerium, such as alumina, which may react with $SO_3$ to form a surface sulfate species. The alumina and cerium components can be supported on an inert support matrix which does not react with sulfur oxides to form sulfate. The $SO_x$ transfer catalyst can be used as an additive particle separate from the cracking catalyst or integrated into the FCC catalyst particle.

The fluid catalyst cracking process includes the steps of (a) cracking a sulfur-containing hydrocarbon stream in contact with a fluidized bed of a particulate cracking catalyst in a cracking zone at cracking conditions including a temperature in the range of 800° F. to 1300° F., whereby sulfur-containing coke is deposited on the catalyst, and removing said hydrocarbon stream from the cracking zone, (b) passing coke-containing catalyst from the cracking zone and an oxygen-containing gas into a cracking catalyst regeneration zone, burning off the sulfur-containing coke from the catalyst in the regeneration zone at a temperature in the range from 1000° F. to 1500° F. to form a flue gas containing sulfur oxides, and removing the flue gas from the catalyst regeneration zone; and (c) returning the resulting coke-depleted catalyst from the catalyst regeneration zone to contact with the hydrocarbon stream in the cracking zone. The $SO_x$ transfer catalyst of this invention is applicable to other moving bed catalytic cracking such as TCC.

The present invention relates to an improved method for decreasing the amount of sulfur oxides in the flue gas by circulating the novel $SO_x$ transfer catalyst of this invention between the catalyst regeneration zone and the cracking zone.

BRIEF DESCRIPTION OF THE DRAWING

The FIGURE is a plot illustrating the relationship between $SO_x$ removal and $O_2$ concentration in the regenerator for various invention catalysts and a commercial catalyst.

DETAILED DESCRIPTION OF THE INVENTION

The present invention is useful in connection with a fluid catalyst cracking (FCC) process for cracking hydrocarbon feeds. Feeds containing sulfur to the extent that $SO_x$ emissions exceed regulated limits are the typical feedstocks which may be processed in the cracking system employing the present invention. Suitable feedstocks include, for example, petroleum distillates or residuals, either virgin or partially refined. Synthetic feeds such as coal oils and shale oils are also suitable. Typically, the suitable feedstocks will boil in the range from about 400°-1100° F. or higher and will have a relatively high sulfur content. The feed may also include recycled hydrocarbons which have already been subjected to cracking.

The cracking catalyst useful in the present invention include any of the numerous conventional cracking catalysts available. One particular class of cracking catalyst which is useful in this invention are the crystalline aluminosilicate zeolites contained within an amorphous matrix.

Suitable crystalline aluminosilicates for use as the cracking catalysts of this invention are described in U.S. Pat. No. 3,140,249 as well as U.S. Pat. No. 3,140,253. Representative crystalline aluminosilicates suitable for the present invention include those natural and synthetic crystalline aluminosilicates having uniform pores of a diameter preferably between about 6 and 15 angstrom units. Such crystalline aluminosilicates include zeolite A or X (U.S. Pat. No. 2,882,243), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979) and zeolite ZSM-12 (U.S. Pat. No. 3,832,449), synthetic mordenite, dealuminized synthetic mordenite merely to name a few, as well as naturally occurring zeolites including chabazite, faujasite, mordenite, and the like. Preferred crystalline aluminosilicates include the synthetic faujasite zeolites X and Y, with particular preference being accorded zeolite Y.

The crystalline aluminosilicate particles employed in the cracking catalyst compositions useful in the present invention are essentially characterized by a high catalytic activity.

This high catalytic activity may be imparted to the particles by base exchanging alkali metal aluminosilicate particles—either before or after dispersion thereof in the matrix—with a base-exchange solution containing ions selected from the group consisting of cations of elements of Groups IB-VIII of the Periodic Table, hydrogen and hydrogen precursors, including mixtures thereof with one another. Hydrogen precursors, such as ammonia and ammonium salts, typically undergo, upon heating degradation to hydrogen cations in contact with aluminosilicates. Suitable methods of base exchange are described in the aforenoted U.S. Pat. Nos. 3,140,249 and 3,140,253.

Where an alkali metal aluminosilicate is employed initially, it is essential to base exchange either the aluminosilicate particles before or after compositing with the matrix to reduce the sodium content of the final product to less than about 4% by weight and preferably less than 1% by weight. The sodium content of the final composite is essentially less than 1% by weight. Such compositions provide high catalytic activity when zeolite Y or zeolite X is the crystalline aluminosilicate component. Preferably, however, and particularly when zeolite Y or X is the crystalline aluminosilicate component, the sodium content of the final composite should be less than 1% by weight.

As previously discussed, base exchange may be accomplished by one or more contacts (before and/or after incorporation of the crystalline aluminosilicate into the matrix) with a solution containing ions selected from the group consisting of cations of the elements of Groups IB-VIII, hydrogen and hydrogen precursors, including mixtures thereof with one another.

It is most preferred that the crystalline aluminosilicate be a rare earth zeolite, that is a crystalline aluminosilicate composition containing rare earth metal cations as a result of treatment with a fluid medium preferably a liquid medium, containing at least one rare earth metal cation. Rare earth metal salts represent the source of rare earth cation. The product resulting from treatment with a fluid medium is an activated crystalline and/or crystalline-amorphous aluminosilicate in which the structure thereof has been modified primarily to the extent of having the rare earth cations chemisorbed or ionically bonded thereto. The rare earth zeolite is preferably calcined prior to incorporation in the final composite.

Where a rare earth zeolite is desired, a wide variety of rare earth compounds can be employed with facility as a source of rare earth ions. Operable compounds include rare earth chlorides, bromides, iodides, carbonates, bicarbonates, sulfates, sulfides, thiocyanates, peroxysulfates, acetates, benzoates, citrates, nitrates, formates, propionates, butylrates, valerates, lactates, malanates, oxalates, palmitates, hydroxides, tartrates, and the like. The only limitation on the particular rare earth metal salt or salts employed is that it be sufficiently soluble in the fluid medium in which it is used to give the necessary rare earth ion transfer. The preferred rare earth salts are the chlorides, nitrates and sulfates.

Representative of the rare earth metals are cerium, lanthanum, praseodymium, neodymium, promethium, samarium, europium, gadolinium, terbium, dysoprosium, holmium, erbium, thulium, scandium, yttrium, and lutecium.

The rare earth metal salts employed can either be the salt of a single rare earth metal or mixtures of rare earth metals, such as rare earth chlorides or didymium chlorides. As hereinafter referred to, a rare earth chloride solution is a mixture of rare earth chlorides consisting essentially of the chlorides of lanthanum, cerium, neodymium and praseodymium with minor amounts of samarium, gadolinium and yttrium. Rare earth chloride solutions are commercially available. It is to be understood that other mixtures of rare earth are also applicable for the preparation of the cracking catalyst compositions useful in this invention, although lanthanum, neodymium, praseodymium, samarium and gadolinium as well as mixtures of rare earth cations containing a predominant amount of one or more of the above cations are preferred since these metals provide optimum activity for hydrocarbon conversion, including catalytic cracking.

Rare earth zeolites for use in this invention may be made by base exchange of sodium zeolite X with rare earth ions to form rare earth zeolite X (see, e.g., U.S. Pat. No. 3,140,249, Example 26), and particularly preferred by base exchange of sodium zeolite Y with rare earth ions to form rare earth zeolite Y, in a similar manner.

Cracking conditions employed in the cracking or conversion step in an FCC system are frequently provided in part by pre-heating and heat-exchanging hydrocarbon feeds to bring them to a temperature of about 600°–750° F. before introducing them into the cracking zone; however, pre-heating of the feed is not essential. Cracking conditions usually include a catalyst/hydrocarbon weight ratio of about 3–10. A hydrocarbon weight space velocity in the cracking zone; of about 300–3,000 WHSV is preferably used. The average amount of coke contained in the catalyst after contact with the hydrocarbons in the cracking zone, when the catalyst is passed to the regenerator, is preferably between about 0.5 weight percent and about 2.5 weight percent, depending in part on the carbon content of regenerated catalyst in the particular system, as well as the heat balance of the particular system.

The catalyst regeneration zone used in an FCC system employing an embodiment of the present invention may be of conventional design. Preferably, the total pressure in the regeneration zone is maintained at at least 20 psig. The gaseous atmosphere within the regeneration zone normally includes a mixture of gases in concentrations which vary according to the locus within the regenerator. The concentration of gases also vary according to the coke concentration on catalyst particles entering the regenerator and according to the amount of molecular oxygen and steam passed into the regenerator. Generally, the gaseous atmosphere in a regenerator contains 5–25% steam, varying amounts of oxygen, carbon monoxide, carbon dioxide and nitrogen. The present invention is applicable in cases in which an oxygen-containing and nitrogen-containing gas, such as air, is employed for combustion of coke in the catalyst regenerator.

For $SO_x$ transfer using an $SO_x$ transfer catalyst, sufficient oxygen levels must be present to burn the coke off the cracking catalyst and oxidize $SO_2$ to $SO_3$ as required for efficient $SO_x$ adsorption on the $SO_x$ transfer catalyst. Accordingly, with prior $SO_x$ transfer catalysts it has been required to operate the regenerator at a full CO combustion mode, i.e., complete oxidation of CO to $CO_2$ and provide an $O_2$ excess of 3 vol % over the complete CO combustion mode requirement. At this level of $O_2$ excess, undesirable $NO_x$ emissions are observed.

In accordance with the present invention, sulfur oxides are removed from the flue gas in the catalyst regeneration zone and released into the reaction zone as hydrogen sulfide by circulating a novel $SO_x$ transfer catalyst between the regenerator and reactor. The novel $SO_x$ transfer catalyst of the present invention is based on the discovery that cerium serves to accelerate the initial rates of $SO_x$ adsorption in the regenerator and, more importantly, accelerates the $H_2S$ release rate in the reactor. It has been found that the rate of hydrogen sulfide released in the reactor is the controlling step in determining the $SO_x$ transfer efficiency of such catalysts and thus, contrary to the teaching of U.S. Pat. No. 4,252,635, cerium can be used advantageously in an $SO_x$ transfer catalyst. An additional advantage to an $SO_x$ transfer catalyst comprising cerium is that such $SO_x$ transfer catalysts operate well at lower regenerator $O_2$ volume excess than prior art $SO_x$ transfer catalysts. With the novel $SO_x$ transfer catalyst of this invention it is possible to operate the regenerator at less than the 3 vol. % excess $O_2$ that has been required for complete CO combustion and $SO_x$ transfer in the prior art. It is possible to operate the regenerator at 0–2 vol. %, preferably 0.5–1%, $O_2$ excess, using the cerium-containing $SO_2$ transfer catalyst of this invention. This lower $O_2$ requirement for $SO_x$ transfer using the $SO_x$ transfer catalyst of the present invention has several important advantages. For one, pollutant $NO_x$ emissions are reduced.

Moreover, by allowing reduced $O_2$ requirements, better thermal efficiency and overall process flexibility are achieved.

Thus, the present invention contemplates a novel $SO_x$ transfer catalyst consisting essentially of a rare earth metal oxidation catalyst comprising cerium or cerium in combination with lanthanum. The addition of lanthanum has been found to improve $SO_x$ transfer efficiency at high regenerator temperatures. In the combined catalyst, there appears to be a coupling of the good high temperature stability properties contributed by the presence of lanthanum with the $SO_x$ uptake and $H_2S$ release rate enhancements provided by the cerium. It is believed that the rare earth (Ce or Ce+La) $SO_x$ transfer catalyst serves to catalyze the reaction of $SO_2$ to $SO_3$, adsorb the sulfur oxide as a sulfate and releases the sulfate as $H_2S$ in the reaction zone. If lanthanum is used in combination with cerium, a weight ratio of cerium to lanthanum of 1:10 to 10:1, preferably 1:2 to 2:1, can be utilized. At higher regenerator temperatures such as above 700° C., it is preferred to increase the lanthanum content, whereas cerium alone is effective at lower regenerator temperatures. Cerium and lanthanum and mixtures thereof can be obtained from any source including commercial sources of rare earth mixtures. The rare earths will typically be in the form of the oxides of these metals. The rare earth metals may be supported on a material which is inert relative to reaction with $SO_x$.

The $SO_x$ transfer catalyst of the present invention preferably includes a metal oxide such as alumina to adsorb $SO_3$ as sulfate. The alumina may be circulated as a separate particle or used as a support for the rare earth component. Preferably, the alumina is an active form with high surface area, which includes synthetic alumina in gamma, eta, and theta forms as well as natural aluminas. The alumina should be free of transition metals such as iron and nickel which will decrease gasoline yield of the FCC catalyst.

When alumina is used as the $SO_3$ adsorbent to form a surface sulfate, the rare earth metal oxidation component comprising cerium will be present in amounts of at least 1 wt. % relative to alumina and preferably, at least 10%, and more preferably, at least 20 wt. %. Again, the weight ratio of cerium to lanthanum if this combination of rare earth metals is used will be 1:10 to 10:1.

The alumina and rare earth components can be further supported on an inert support or matrix which does not react with $SO_2$ or $SO_3$ to form sulfate. The supports for the alumina and rare earth oxidation component may be selected from silica, silica/alumina, zeolites, kieselguhr, celite or alumina. In the event zeolites are used as the matrix, zeolites having a high silica to alumina framework ratio are preferred. High surface area, inertness to reaction with $SO_x$ and stability with respect to hydrothermal treatment are the necessary characteristics. Importantly, the supports should not contain transition metals.

The $SO_x$ transfer catalyst can be prepared in several ways. For example:

(1) the support can be impregnated with an appropriate amount of metal salt, such as aqueous soluble salts including aluminum chloride and/or rare earth chloride compounds.

(2) If the support is a zeolite, aluminum and/or rare earth can be incorporated by ion exchange. The zeolite support can be exchanged competitively, but sequential ion exchange with the rare earth followed by aluminum is preferred. Such an exchange procedure tends to make the support more stable hydrothermally.

(3) The rare earth can be mixed with the alumina or its precursors first. Subsequently the mixture can be mixed with the support material in gel form and then spray dried.

In order to obtain a catalyst with high attrition resistance, the ratio of inert support to alumina should be greater than about 0.05, preferably about 0.1–0.3. Of course, this ratio will depend on the catalyst preparation procedure. For instance, the ratio of inert support to alumina for the procedure wherein the rare earth and alumina are mixed first and then combined with the support material can be lower than that required for the other procedures. The ratio should be kept as low as the attrition resistance permits to maximize the $SO_x$ transfer capacity of the catalyst, therefore minimizing the circulation rate of the $SO_x$ transfer catalyst in the FCC system. Furthermore, to prevent attrition losses, the $SO_x$ transfer catalyst particles should also be of similar form, size, and density to the FCC catalyst system in place.

In carrying out the invention, the $SO_x$ transfer catalyst particles are introduced into a cracking system and circulated in physical mixture with the cracking catalyst. The amount of separate, $SO_x$ transfer catalyst particles employed in the particulate solids inventory is preferably 25 weight percent, or less, of the total particulate solids inventory circulating in the cracking system. The addition of an amount of $SO_x$ transfer catalyst between 1.0 and 25 weight percent of the total particulate solids inventory is particularly preferred. Thus, the $SO_x$ transfer efficiency can be maintained independently of the activity of the of cracking catalyst. This flexibility is important since more $SO_x$ transfer catalyst can be added if the sulfur content of the feed is increased or if the $SO_x$ transfer catalyst ages at a rate different than the cracking catalyst, thereby maintaining a constant level of $SO_x$ reduction. The size, shape and density of separate, $SO_x$ transfer catalyst particles circulated in admixture with cracking catalyst particles is preferably such that the $SO_x$ transfer catalyst particles circulate in substantially the same manner as conventional catalyst particles in the particular cracking system, e.g., beads are used in a moving-bed, bead-catalyst unit, whereas 50-100 micron diameter particles are quite suitable in an FCC unit.

The alumina and/or rare earth oxides in the $SO_x$ transfer catalyst react with the sulfur oxides and oxygen in the cracking catalyst regenerator to form a sulfur-containing solid, such as a sulfate of aluminum or cerium. In this way, sulfur oxides are removed from flue gas in the the regenerator. Particles containing the solid, sulfur-containing $SO_x$ transfer catalyst are passed to the cracking zone along with the regenerated cracking catalyst. In the cracking zone, hydrogen sulfide is formed by reaction of sulfur in the sulfur-containing $SO_x$ transfer catalyst with the stream of hydrocarbon being treated in the cracker. Alumina and/or rare earth oxides in the $SO_x$ transfer catalyst are regenerated. In addition to forming hydrogen sulfide, the reaction between the sulfur containing solid and the hydrocarbon feed may produce some other sulfur compounds such as carbon oxysulfide, organic sulfides, etc., which are in the vapor-phase at cracking conditions. The resulting hydrogen sulfide and other vapor-phase sulfur compounds exit the cracking zone as a part of the stream of cracked hydrocarbons, along with a much larger amount of vapor-phase sulfur compounds formed directly from sulfur in the hydrocarbon feed during the cracking reactions. Off-gas subsequently separated from the cracked hydrocarbon stream thus includes hydrogen sulfide formed directly from the feed sulfur as well as hydrogen sulfide formed by reaction of the sulfur containing $SO_x$ transfer catalyst solid with the hydrocarbon stream or by hydrolysis upon contact with steam in the stripping zone of the fluid catalytic cracker.

In an alternative embodiment of the present invention, the $SO_x$ transfer catalyst may be incorporated into the FCC catalyst. When the $SO_x$ transfer catalyst is incorporated into the FCC catalyst, the FCC catalyst system management is simplified. In addition, the catalyst is generally attrition-resistant. This alternative embodiment may be useful when the $SO_x$ transfer catalyst consists of the rare earth metals cerium or cerium and lanthanum. However, the important process flexibility described above is diminished. To prepare the FCC catalyst with enhanced $SO_x$ transfer activity, the following general procedure can be used. The rare earth metal is incorporated into the alumina by impregnation or co-precipitation. This mixture and the zeolite FCC catalyst component is mixed with additional binders, preferably silica-alumina gel, and finally spray dried. Of course the rare earth metal may be mixed with the FCC catalyst directly and spray dried if alumina is not used as the $SO_x$ adsorbent. Extensive use of alumina binder tends to produce a low attrition-resistant catalyst because the alumina binder becomes involved in the $SO_2$ transfer reaction and looses its binding capacity during the repeated chemical and physical transformations.

Currently available $SO_x$ transfer catalysts suffer attrition losses. The characteristics of the improved catalyst of this invention, besides better $SO_x$ transfer performance, can be improved to provide increased structural integrity and attrition resistance by inclusion of silica as a support. Since most $SO_x$ transfer catalysts are based on alumina, which is quite soft, one approach to strengthening the material is via bonding with silica or silica-alumina. The presence of silica can have a significant effect on the $SO_x$ transfer capabilities of the rare earths as compared to pure alumina due to differences in metal-support interactions. Cerium is surprisingly quite effective as a $SO_x$ transfer catalyst even supported on silica which is inert to $SO_x$ transfer.

The following examples are for the purpose of illustrating the preferred embodiments of the invention only and should not be construed so as to limit the scope of the invention.

EXAMPLE 1

This example illustrates the ability of cerium to promote oxidation of $SO_2$. In studying the activities of various rare earth exchanged X zeolites for $SO_2$ oxidation, it was found that CeX is active and LaX is inactive. The oxidation of $SO_2$ leads to the formation of sulfate.

X zeolites in various forms were sulfided by heating the catalysts in a flow of pure $H_2S$ at atmospheric pressure. The sulfiding temperature was increased from room temperature to 700° F. slowly (in about 3 hrs.). The sulfided catalyst was cooled down to room temperature in $N_2$ flow. The catalysts were tested for the presence of $SO_4$ by extracting the catalyst with HCl (or $H_2O$) and reacting the extracts with $BaCl_2$. The appearance of a white precipitate is an indication of the presence of $SO_4$ ion. Using an X-ray diffraction method, this precipitate was identified to be $BaSO_4$.

The experimental results are listed in Table 1.

TABLE 1

| Run No. | Catalyst | Treatment After Sulfiding | Presence of $SO_4$ |
|---|---|---|---|
| 1 | LaX | The powder was exposed to air for 20 hrs. | No |
| 2 | CeX | The powder was exposed to air for 15 min. | Yes |
| 3 | La/Ni/X | The powder was exposed to air for 20 hours. | Trace |

The sulfate appears to be formed via oxidation of the $H_2S$ adsorbed on the catalyst. If this is true, CeX is indeed very active for oxidation of $SO_2$. The activity for $SO_2$ oxidation appears to be related to the redox capability of the exchanging material. This capability is invoked to explain why CeX is active but LaX is not. Apparently Ce itself is a good $SO_2$ oxidation catalyst because it was once considered for this reaction, even though it was found to be less active than V and Pt. CeX was found to be much more active than La/Ni/X for oxidation of $SO_2$, comparing runs 2 and 3. The activity of impregnated Ni was also found to be much less active than exchanged Ce.

For Examples 2 and 3 the following procedure was utilized. Gamma alumina-supported cerium and lanthanum materials were prepared by aqueous impregnation (incipient wetness) of the gamma alumina (Kaiser) with ceric ammonium nitrate and lanthanum chloride heptahydrate. These were then calcined in air at 538° C. for 4 hours and allowed to equilibrate to ambient conditions before testing. 20 wt. % La, 20 wt. % Ce, and 10 wt. % La/10 wt. % Ce on gamma alumina were prepared in this fashion. These rare earth loadings were chosen so as to be in nominal agreement with the 19.7 wt. % total rare earth loading (mostly lanthanum) reported for a commercially available $SO_x$ transfer catalyst which was tested for comparison. Similarly prepared were silica-supported (Hysil 233) cerium and lanthanum materials.

To monitor the rate and extent of $SO_x$ uptake by the catalysts, as well as the rate and extent of sulfur release as $H_2S$, weight gains and losses were recorded using a thermogravimetric analysis (TGA) under simulated FCC conditions. Included in Tables 2 and 3 are the gas compositions, flow rates and temperatures used in the experiments for comparing relative catalyst behavior. Each catalyst sample was subjected to four complete cycles of $SO_x$ uptake/release steps for five minutes per each step. Five minutes was chosen for two reasons. First, this is very nearly the same residence time that the catalyst would have in a regenerator in an FCC unit for oxidation and an uptake of $SO_2$. Second, although the catalyst residence time in the riser section of an FCC is only about 8 sec., measuring the sulfur release rate for the catalyst is very difficult to do accurately on this time scale. Much more precise measurements of the initial $H_2S$ release rates can be observed by extending the time to five minutes.

Example 2 was carried out at 675° C. for the $SO_x$ uptake step, simulating moderately low regenerator temperature operation while Example 3 was carried out at 725° C., typical of the more severe temperatures commonly experienced in current FCC regenerator operations. In both examples, the temperature for the $H_2S$ release step was set at 540° C., typical of that in an actual FCC riser. The percent weight increase/decrease after each 5 min. uptake/release step was measured for each of four complete cycles for 20 wt. % La/$\gamma$-alumina, 20 wt. % Ce/$\gamma$-alumina, 10 wt. % Ce/10 wt. % La/$\gamma$-alumina, and the commercial $SO_x$ transfer catalyst described above. Base line experiments for pure $\gamma$-alumina were also performed in this fashion.

EXAMPLE 2

Table 2 summarizes the results from the $SO_x$ transfer cycling experiments carried out at 675° C. $SO_x$ uptake temperature for 20 wt. % La/$\gamma$-alumina, 20 wt. % Ce/$\gamma$-alumina, 10 wt. % Ce/10 wt. % La/$\gamma$-alumina, $\gamma$-alumina and the commercial $SO_x$ transfer catalyst. The $SO_x$ uptake levels for the three rare earth materials that were prepared in accordance with the present invention are comparable and are a factor of 2 to 3 larger than that observed using the commercial catalyst. The $H_2S$ release rates are also similar among the invention materials, being a factor of 2 to 3 faster than those observed for the commercial catalyst. Here the $H_2S$ release rate is simply defined as the catalyst weight loss observed over the 5 minute measurement period. The average percent utilization of the catalyst (defined as the percent of "reversible" catalyst capacity for $SO_x$ transfer) is also somewhat higher for the invention materials.

EXAMPLE 3

Table 3 similarly summarizes results from the $SO_x$ transfer cycling experiments carried out at a 725° C. $SO_x$ uptake temperature. Compared to the runs at 675° C., there is a more marked difference in behavior among these materials at 725° C. In particular, those catalysts which incorporate cerium show improved $H_2S$ release and utilization compared to the lanthanum catalyst or the commercial catalyst. The mixed metal 10 wt. % Ce/10 wt. % La/$\gamma$-alumina shows the best performance of all, having superior $SO_x$ uptake levels and $H_2S$ release rates to either the 20 wt. % La/$\gamma$-alumina or the 20 wt. % Ce/$\gamma$-alumina. A synergistic effect for $SO_x$ transfer is clearly evidenced here for the cerium in combination with lanthanum on $\gamma$-alumina.

A proper way to compare the relative $SO_x$ transfer performance as obtained in Examples 2 and 3 is by considering the average net $SO_x$ removal from the system, as shown in Table 4. Here, the net $SO_x$ removal is defined as the fraction utilization x % wt. gain (from Tables 2 and 3), i.e. the amount of $SO_x$ (as accounted for by the catalyst weight increase) that is ultimately transferred out of the system via the $H_2S$ release step. Values are expressed as averages over the 4 cycles of each run. For 675° C. $SO_x$ uptake cycling, the two cerium-containing catalysts show the best overall $SO_x$ transfer performance—almost 20% better than that containing lanthanum alone. Their performance is three times better than that of the commercial catalyst. The presence of cerium clearly has a positive effect on the $SO_x$ transfer cycle under these conditions. In addition, it is surprising to see that $\gamma$-$Al_2O_3$ alone also outperforms the commercial catalyst under these conditions.

For 725° C. $SO_x$ uptake cycling, the Ce/La mixed oxide catalyst shows significantly better performance than either the Ce or La catalyst alone, again exhibiting the synergistic effects of Ce and La for $SO_x$ transfer. Its average net $SO_x$ removal is almost 2.5 times greater than that of the commercial catalyst, representing a significant improvement of $SO_x$ transfer performance over the commercial catalyst at the higher regenerator temperatures more typical of actual FCC operation. Although the precise chemical nature and thermodynamics of the surface sulfate species formed on the mixed metal/$\gamma$-alumina is not known, there does appear to be a coupling of the good high temperature stability properties contributed by the presence of lanthanum with the $SO_x$ uptake and $H_2S$ release rate enhancements provided by the cerium. Improvements in $SO_x$ uptake, $H_2S$ release and transfer efficiency are seen over a wide range of regenerator temperatures using the $SO_x$ transfer catalyst of this invention. Moreover, there appears to be a relationship between the $SO_x$ transfer catalyst performance and rare earth composition. Thus, the Ce and La contents can be chosen dependent of regenerator temperature to obtain the highest transfer efficiency.

TABLE 2

$SO_x$ Transfer Catalyst Performance - TGA 5-Minute Cycling Runs $SO_2$ Uptake Conditions:
Temperature, °C. = 675
Gas Composition = 0.6% $SO_2$, 2.0% $O_2$, 97.4% $N_2$
Flow Rate, cc/min = 100
$H_2S$ Release Conditions:
Temperature, °C. = 540
Gas Composition = 5.7% $H_2$, 94.3% $N_2$
Flow Rate, cc/min = 100

| Catalyst | Cycle # | $SO_x$ Uptake[a] (wt. %) | $H_2S$ Release[b] (wt. %) | Utilization[c] (%) |
|---|---|---|---|---|
| 20 wt. % La/ | 1 | 13.1 | −5.5 | 42 |
| $\gamma$-$Al_2O_3$ | 2 | 10.4 | −8.2 | 79 |
|  | 3 | 12.1 | −7.8 | 65 |
|  | 4 | 11.4 | −6.5 | 57 |
| 10 wt. % Ce/ | 1 | 13.0 | −7.3 | 57 |
| 10 wt. % La/ | 2 | 11.8 | −9.1 | 77 |
| $\gamma$-$Al_2O_3$ | 3 | 12.7 | −8.7 | 68 |
|  | 4 | 12.9 | −7.5 | 58 |
| 20 wt. % Ce/ | 1 | 11.9 | −8.2 | 69 |
| $\gamma$-$Al_2O_3$ | 2 | 10.6 | −8.7 | 82 |

TABLE 2-continued

$SO_x$ Transfer Catalyst Performance - TGA 5-Minute Cycling Runs

$SO_2$ Uptake Conditions:
Temperature, °C. = 675
Gas Composition = 0.6% $SO_2$, 2.0% $O_2$, 97.4% $N_2$
Flow Rate, cc/min = 100
$H_2S$ Release Conditions:
Temperature, °C. = 540
Gas Composition = 5.7% $H_2$, 94.3% $N_2$
Flow Rate, cc/min = 100

| Catalyst | Cycle # | $SO_x$ Uptake[a] (wt. %) | $H_2S$ Release[b] (wt. %) | Utilization[c] (%) |
|---|---|---|---|---|
| | 3 | 12.9 | −7.7 | 60 |
| | 4 | 12.4 | −8.8 | 71 |
| Commercial | 1 | 5.4 | −2.0 | 37 |
| Catalyst | 2 | 4.8 | −3.0 | 63 |
| | 3 | 4.8 | −2.4 | 50 |
| | 4 | 4.2 | −3.1 | 74 |
| $\gamma Al_2O_3$ | 1 | 5.9 | −4.1 | 70 |
| | 2 | 6.0 | −4.1 | 69 |
| | 3 | 5.9 | −3.9 | 66 |

[a]Weight gain based on dry catalyst, start-of-cycle weight.
[b]Weight loss based on dry catalyst, start-of-cycle weight.
[c]Utilization (%) = $\frac{\% \text{ wt. loss}}{\% \text{ wt. gain}} \times 100\%$

TABLE 3

$SO_x$ Transfer Catalyst Performance - TGA 5-Minute Cycling Runs

$SO_2$ Uptake Conditions:
Temperature, °C. = 725
Gas Composition = 0.6% $SO_2$, 2.0% $O_2$, 97.4% $N_2$
Flow Rate, cc/min = 100
$H_2S$ Release Conditions:
Temperature, °C. = 540
Gas Composition = 5.7% $H_2$, 94.3% $N_2$
Flow Rate, cc/min = 100

| Catalyst | Cycle # | $SO_x$ Uptake[a] (wt. %) | $H_2S$ Release[b] (wt. %) | Utilization[c] (%) |
|---|---|---|---|---|
| 20 wt. % La/ | 1 | 12.1 | −3.1 | 26 |
| $\gamma$-$Al_2O_3$ | 2 | 6.8 | −3.2 | 47 |
| | 3 | 7.4 | −2.5 | 33 |
| | 4 | 6.3 | −2.9 | 46 |
| 10 wt. % Ce/ | 1 | 10.6 | −3.8 | 35 |
| 10 wt. % La/ | 2 | 8.6 | −5.6 | 66 |
| $\gamma$-$Al_2O_3$ | 3 | 9.2 | −5.9 | 64 |
| | 4 | 9.7 | −5.9 | 61 |
| 20 wt. % Ce/ | 1 | 4.9 | −3.5 | 71 |
| $\gamma$-$Al_2O_3$ | 2 | 4.8 | −3.9 | 81 |
| | 3 | 4.7 | −3.7 | 78 |
| | 4 | 4.6 | −3.2 | 71 |
| Commercial | 1 | 5.3 | −1.9 | 36 |
| Catalyst | 2 | 5.6 | −2.4 | 43 |
| | 3 | 6.1 | −2.0 | 33 |
| | 4 | 6.1 | −2.7 | 43 |
| $\gamma$-$Al_2O_3$ | 1 | 2.8 | −2.2 | 77 |
| | 2 | 3.0 | −2.2 | 72 |
| | 3 | 3.9 | −2.8 | 72 |

[a]Weight gain based on dry catalyst, start-of-cycle weight.
[b]Weight loss based on dry catalyst, start-of-cycle weight.
[c]Utilization (%) = $\frac{\% \text{ wt. loss}}{\% \text{ wt. gain}} \times 100$

TABLE 4

Average Net $SO_x$ Removal for 5 Minute Cycles[a]

| Catalyst | $SO_2$ Uptake Temperature | |
|---|---|---|
| | 675° C. | 725° C. |
| 20 wt. % La/$\gamma$-$Al_2O_3$ | 7.0 | 2.9 |
| 10 wt. % Ce/10 wt. % La/$\gamma$-$Al_2O_3$ | 8.2 | 5.3 |
| 20 wt. % Ce/$\gamma$-$Al_2O_3$ | 8.4 | 3.6 |
| Commercial Catalyst | 2.6 | 2.2 |
| $\gamma$-$Al_2O_3$ | 4.0 | 2.4 |

[a]Expressed as wt. % of catalyst, where $SO_x$ removal is defined as utilization x % wt. gain (from Tables 1 and 2).

EXAMPLE 4

To examine the potential effects of any rare earth-/silica interactions (or lack thereof), TGA runs were carried out for 20% Ce on silica and 20% La on silica. (A baseline run with pure silica showed that it has no affinity whatsoever for $SO_x$ uptake.) Although the lanthanum on silica showed slightly greater $SO_x$ uptake at 675° C. than did the cerium (10.8% vs 8.9%), the rate of $H_2S$ release at 540° C. for lanthanum on silica was more than 10 times slower than the release rate from cerium on silica. In other words, the reducibility of the cerium sulfate surface species is accomplished readily, while the lanthanum sulfate species on silica is virtually irreducible. It should also be noted that the rate of $H_2S$ release from the 20% Ce on silica is roughly 20% of that observed for 20% Ce on alumina in the previous experiments.

From these results it is clear that the support has a dramatic effect on the $SO_x$ transfer capability of a given rare earth. These results also suggest that for materials which may be silica bound to improve their physical strength for potential commercial use, the incorporation of cerium as an active rare earth component is preferred. Finally, these results indicate that alumina is not essential for a complete $SO_x$ transfer cycle to be carried out. Alumina does appear to be necessary, however, to facilitate the $SO_x$ transfer process, which itself appears to be more directly linked to the sulfation/reduction of the rare earth surface species.

EXAMPLE 5

This example was carried out using the same procedure as in Example 3 except the $O_2$ concentration in the regenerator was varied. The Figure summarizes the net $SO_x$ removal for various $SO_x$ transfer catalysts relative to the $O_2$ concentration. At the higher regenerator temperatures, the results show that the mixed Ce/La catalyst is preferred as discussed earlier. Moreover, each $SO_x$ transfer catalyst made in accordance with this invention shows $SO_x$ removal at low $O_2$ concentrations.

What is claimed:

1. In a process for reducing $SO_x$ emissions from flue gas in a hydrocarbon catalytic cracking system wherein a cracking catalyst and an $SO_x$ transfer catalyst are circulated between catalyst regeneration zone where sulfur oxides contained in said regeneration zone are reacted with said $SO_x$ transfer catalyst and a hydrocarbon cracking zone where hydrogen sulfide is formed by contacting said reacted $SO_x$ transfer catalyst with a hydrocarbon stream, the improvement comprising operating said regenerator at a temperature of at least 700° C. and using as said $SO_x$ transfer catalyst alumina and at least 1 wt. % of a rare earth mixture of cerium and lanthanum relative to said alumina.

2. The process of claim 1 wherein the weight ratio of cerium to alumina is at least 0.1.

3. The process of claim 1 wherein the weight ratio of cerium to lanthanum is 1:10 to 10:1.

4. The process of claim 3 wherein the weight ratio or cerium to lanthanum is 1:2 to 2:1.

5. The process of claim 1 wherein said alumina is selected from the group consisting of gamma, eta, theta synthetic alumina and natural alumina.

6. The process of claim 1 wherein said alumina is free of transition metals.

7. The process of claim 1 wherein said rare earth mixture is contained on said alumina, and further including a matrix to support said rare earth mixture and alumina.

8. The process of claim 7 wherein said support is selected from the group consisting of silica, silica-alumina, zeolites, kieselguhr, celite, and alumina.

9. The process of claim 8 wherein said support is silica.

10. The process of claim 1 wherein said $SO_x$ transfer catalyst is combined with a cracking catalyst as a single particle.

11. The process of claim 1 wherein said $SO_x$ transfer catalyst is circulated as a separate particle distinct from the cracking catalyst.

12. The process of claim 1 wherein said regenerator is operated at less than a 3 vol. % excess of $O_2$ required to completely oxidize CO to $CO_2$.

13. The process of claim 12 wherein said excess of $O_2$ is 0-2 vol. %.

14. The process of claim 12 wherein the weight ratio of cerium to lanthanum is 1:10 to 10:1.

15. In a process for reducing $SO_x$ emissions from flue gas in a hydrocarbon catalytic cracking system wherein a cracking catalyst and an $SO_x$ transfer catalyst are circulated between a catalyst regeneration zone where sulfur oxides contained in said regeneration zone are reacted with said $SO_x$ transfer catalyst and a hydrocarbon cracking zone where hydrogen sulfide is formed by contacting said reacted $SO_x$ transfer catalyst with a hydrocarbon stream, the improvement comprising wherein said $SO_x$ transfer catalyst consists essentially of cerium or a combination of cerium and lanthanum supported on a silica matrix which is inert to reaction with $SO_x$.

16. The process of claim 15 wherein said $SO_x$ transfer catalyst includes lathanum.

17. The process of claim 16 wherein the weight ratio of cerium to lanthanum is 1:10 to 10:1.

18. The process of claim 17 wherein the weight ratio of cerium to lanthanum is 1:2 to 2:1.

19. The process of claim 16 wherein the regenerator is operated at a temperature of at least 700° C.

20. The process of claim 19 wherein the weight ratio of cerium to lanthanum is 1:10 to 2:1.

21. The process of claim 15 wherein said $SO_x$ transfer catalyst is circulated as a separate particle distinct from the cracking catalyst.

22. The process of claim 15 wherein said rengenerator is operated at less than a 3 vol. % excess of $O_2$ required completely oxidize CO to $CO_2$.

23. The process of claim 22 wherein said excess of $O_2$ is 0-2 vol. %.

24. The process of claim 22 wherein said $SO_x$ transfer catalyst further includes lanthanum.

25. The process of claim 24 wherein the weight ratio of cerium to lanthanum is 1:10 to 10:1.

* * * * *